United States Patent
Zhao et al.

(10) Patent No.: US 11,983,204 B1
(45) Date of Patent: May 14, 2024

(54) MOBILE TERMINAL-ORIENTED COMPLEX CONDITION GEOGRAPHIC INFORMATION QUERY METHOD, DEVICE AND MEDIUM

(71) Applicant: Beijing University of Posts and Telecommunications, Beijing (CN)

(72) Inventors: Shuai Zhao, Beijing (CN); Bo Cheng, Beijing (CN); Shengjie Li, Beijing (CN); Junliang Chen, Beijing (CN)

(73) Assignee: BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 0 days.

(21) Appl. No.: 18/486,181

(22) Filed: Oct. 13, 2023

(30) Foreign Application Priority Data

Oct. 14, 2022 (CN) .......................... 202211263846.5

(51) Int. Cl.
*G06F 16/29* (2019.01)
*G06F 16/2455* (2019.01)

(52) U.S. Cl.
CPC ........ *G06F 16/29* (2019.01); *G06F 16/24552* (2019.01); *G06F 16/24564* (2019.01)

(58) Field of Classification Search
None
See application file for complete search history.

(56) References Cited

U.S. PATENT DOCUMENTS

| 8,447,948 | B1* | 5/2013 | Erdogan | G06F 12/0871 711/159 |
| 2010/0287187 | A1* | 11/2010 | Wang | G06F 16/5838 707/769 |
| 2015/0189033 | A1* | 7/2015 | Han | H04L 67/288 709/203 |

(Continued)

FOREIGN PATENT DOCUMENTS

CN 113177058 A 7/2021

OTHER PUBLICATIONS

CNIPA, Notification of Third Office Action for CN202211263846.5, dated Dec. 21, 2022.

(Continued)

*Primary Examiner* — Christopher J Raab
(74) *Attorney, Agent, or Firm* — Zhigang Ma (57) ABSTRACT

The mobile terminal-oriented complex condition geographic information query method, device and medium are disclosed, and the method includes: determining geographic information query condition semantics, and setting complex condition query contents according to condition semantic regulations; based on a preset query rule, analyzing conditions meeting the rule, and obtaining attribute information of target objects and attribute information of condition objects forming complex conditions; and according to the attribute information of the target objects and the attribute information of the condition objects, performing server calculation query and returning a geographic information query result. Based on collection, storage and classification of the geo- (Continued)

graphic entity position information, the geographic entity position information of a specific type and space limitation is inquired, so that the function of simultaneously limiting the conditions of target objects by the mobile terminal is enriched.

5 Claims, 3 Drawing Sheets

(56) References Cited

U.S. PATENT DOCUMENTS

| | | | |
|---|---|---|---|
| 2016/0065689 A1* | 3/2016 | Imai | H04L 67/568 709/238 |
| 2018/0322055 A1* | 11/2018 | Iyengar | G06F 12/0868 |
| 2018/0358014 A1* | 12/2018 | Bang | G06F 3/167 |
| 2020/0344128 A1* | 10/2020 | Chen | G06F 16/9574 |

OTHER PUBLICATIONS

Beijing University of Posts and Telecommunications (Applicant), Reply to Notification of Third Office Action for CN202211263846.5, w/ (allowed) replacement claims, dated Dec. 27, 2022.

CNIPA, Notification to grant patent right for invention in CN202211263846.5, dated Jan. 20, 2023.

* cited by examiner

MOBILE TERMINAL-ORIENTED COMPLEX CONDITION GEOGRAPHIC INFORMATION QUERY METHOD, DEVICE AND MEDIUM

TECHNICAL FIELD

The disclosure belongs to the technical field of a geographic information query, and relates to a solution for semantic segmentation processing of three-dimensional (3D) point clouds, in particular to a mobile terminal-oriented complex condition geographic information query method, a mobile terminal-oriented complex condition geographic information query device and a non-transitory computer readable storage medium.

BACKGROUND

After entering the 21st century, the scope of use of smart phones is constantly expanding. The evolution of mobile technology has increased the need for complex software applications of mobile devices, and this technology-driven market evolution has created new opportunities and challenges for developers. In this context, mobile application products have grown by leaps and bounds, and the continuous development of mobile Internet technology and the research and development of smart phone software and hardware complement each other. The hardware equipment of smartphones has become more and more advanced, and the software products of corresponding devices have become more and more abundant, and more rich and convenient mobile applications are displayed in people's field of vision.

With the continuous increase of geographic entity information related to offline scenes, the demand for related geographic information queries is constantly enriched. A geographic information system (GIS) is a computer-based tool that can be used to collect, store, manipulate, and visualize geographic information, which is an application that supports query, analysis, and decision-making processes. The geographic information query is an important application field of the GIS. The existing geographic information and the maturity of the mobile terminal construction technology provide a theoretical basis for the completion of a complex condition geographic information query system, and a mobile terminal-oriented complex condition geographic information query system is an indispensable tool to help special departments conduct specific information queries.

Most of the existing geographic entity location information query systems can only support simple conditional queries, or search for more possible targets according to a specific category, and cannot support complex condition geographic information query functions; and because geographic entity location information involving the calculation of spatial relations, coupled with the query of complex conditions, there will be restrictions on the parent-child relationship attribute conditions and quantity conditions, which makes the response speed of complex geographic information queries slow; and the existing geographic information query systems rarely consider optimizing query performance because of their slightly lower data richness, and with the continuous improvement of geographic entity information data, it can bring longer calculation waiting time.

Therefore, there is an urgent need for the mobile terminal-oriented complex condition geographic information query system and method to solve the above problems.

SUMMARY

The disclosure is provided to solve the above-mentioned problems existing in the prior art. A mobile terminal-oriented complex condition geographic information query method, a mobile terminal-oriented complex condition geographic information query device and a non-transitory computer readable storage medium are provided, the disclosure can query specific types and space-limited geographic entity location information based on the collection, storage and classification of geographic entity location information, thereby enriching the function of the mobile terminal to limit the conditions of multiple target objects at the same time.

According to the first solution of the disclosure, a mobile terminal-oriented complex condition geographic information query method is provided, and the method includes:
  determining conditions semantics of a geographical information query, and setting query contents of complex conditions according to the conditional semantics;
  analyzing, based on a preset query rule, conditions that meet the preset query rule, and obtaining attribute information of target objects and attribute information of condition objects; and the target objects and the condition objects being composed of the complex conditions; and
  performing, according to the attribute information of the target objects and the attribute information of the condition objects, a server calculation query, and obtaining a geographic information query result.

In an embodiment, the step of determining conditions semantics of a geographical information query and setting query contents of complex conditions according to the conditional semantics, includes: determining query requirements in different usage scenarios, defining query semantics, and mapping the query semantics into the complex conditions through constituent elements; the complex conditions formed by the query semantics for the different usage scenarios include point of interest (POI) categories, POI attributes, the target objects, and the condition objects that have a positional relationship with the target objects; the POI categories include building categories and natural area categories; the PIO attributes include areas and scores of the POI categories, and the positional relationship includes a radiation radius and a containment relationship.

In an embodiment, the step of analyzing, based on the preset query rule, conditions that meet the preset query rule and obtaining attribute information of target objects and attribute information of condition objects, includes the following contents: the preset query rule includes dividing a query of the complex conditions into two dimensions, which include the target objects and the condition objects; the target objects include categories, names and attribute support, and the attribute support includes areas, people/vehicle flows, scores, and a number of entrances and exits; the condition objects include categories, names, and attributes; the condition objects have a positional relationship with the target objects, and the positional relationship includes one of inclusion relationship, within the target, within the radiation radius and not included within the radius; the complex conditions are analyzed according to the preset query rule, and the attribute information of the target objects and the attribute information of the condition objects are obtained.

In an embodiment, the step of performing, according to the attribute information of the target objects and the attribute information of the condition objects, a server calculation query and obtaining a geographic information query result, includes:

using, according to the query request composed of the attribute information of the target objects and the attribute information of the condition objects, a formalized model to model the query request through a formalized logic algorithm, and converting the query request into a formalized query condition;

based on the formalized query condition and data from multiple sources: for a query of the target objects, filtering the categories, the names, and the attributes of the target objects, and obtaining the geographic information query result; for a query of the condition objects, filtering the categories, the names, and the attributes of the condition objects, and according to the positional relationship, performing a spatial relationship calculation on a target object set and a condition object set, and obtaining the geographic information query result.

In an embodiment, the method further includes:

determining target values of cache objects in a cache server according to access frequencies, collection frequencies and object sizes of the cache objects; the cache objects include the target objects and the condition objects in the complex conditions, and the target values of the cache objects in the cache server are calculated by the following formula:

$$H(k) = L + (Fr(k) + C(k)) * \frac{\text{Value}_{(k)}}{\log_2(\text{Size}(k))};$$

where $H(k)$ represents a value of a cache object $k$; Value($k$) represents a cost of access delay and network bandwidth for adding the cache object $k$ to the cache server; Size($k$) represents a size of the cache object $k$; $L$ represents an expansion factor, an initial value of $L$ is 0, an object replacement is performed when a cache capacity is insufficient, and a value $H(j)$ of a replaced object $j$ with the largest value among a plurality of replaced objects with small values is assigned to $L$; $Fr(k)$ represents a number of accesses (i.e., access frequency) of the cached object $k$, and an initial value of $Fr(k)$ is set to 1; and $C(k)$ represents a number of times that the cache object $k$ is stored in a database; updating the cache objects in the cache server according to the target values of the cache objects in the cache server.

In an embodiment, the step of updating the cache objects in the cache server according to the target values of the cache objects in the cache server, includes:

initializing parameters: letting the expansion factor $L=0$ and a used cache space $Mu=0$, and setting $Mt$ to a capacity value of the cache server;

determining the cache object $k$ that needs to be cached at present according to a query request; determining whether the cache object $k$ is in a self-defined template data table, setting $C(k)=0$ when the cache object $k$ is determined not to be in the self-defined template data table, otherwise, assigning a number of existing items to $C(k)$;

determining whether the cache object $k$ is in the cache space;

updating the access frequency $Fr(k)$ of the cache object $k$ through the following formula: $Fr(k)=Fr(k)+1+C(k)$ and recalculating the value $H(k)$ of the cache object $k$, when the cache object $k$ is determined to be in the cache space;

when the cache object $k$ is determined not to be in the cache space, it indicates that the query request fails to hit the cache server, sending the query request to a server, and returning the cache object $k$ after a query calculation operation is performed through a database in the server; updating the access frequency $Fr(k)$ of the cache object $k$ through the following formula: $Fr(k)=1+C(k)$, calculating the value $H(k)$ of the cache object $k$, and determining whether a value of a cache remaining space of the cache server is not less than the size $Mk$ of the cache object $k$;

when the value of the cache remaining space of the cache server is determined not to be less than the size $Mk$ of the cache object $k$, adding the cache object $k$ to the cache, and updating the value of the used cache space $Mu$ through the following formula: $Mu=Mu+Mk$;

when the value of the cache remaining space of the cache server is determined to be less than the size $Mk$ of the cache object $k$, sorting the cache objects from low to high according to $H(k)$, and obtaining n objects from the cache space by values from low to high; making the n objects satisfy $H(k1) \leq H(k2) \leq H(k3) \leq \ldots \leq H(kn)$ and satisfy the following conditions:

$$Mk \leq Mt - Mu + \sum_{j=1}^{n} \text{Size}(k, j);$$

where $j$ represents a cache object in the cache server, and Size($k$, $j$) represents a size of the cache object $k$ and the cache object $j$ to be removed;

updating $L$ to be the largest value of target value function values (i.e., values $H(i)$, $i=1, 2, \ldots n$) among the n objects; removing the n objects from the cache in turn, and adding the cache object $k$; updating the size of the current cache space used as follows:

$$Mu = Mu + Mk - \sum_{j=1}^{n} \text{Size}(k, j).$$

According to the second solution of the disclosure, a mobile terminal-oriented complex condition geographic information query device is provided, and the device includes:

a complex condition query module, configured to determine conditions semantics of a geographical information query, and set query contents of complex conditions according to the condition semantics; analyze, based on a preset query rule, conditions that meet the rule, and obtain attribute information of target objects and attribute information of condition objects, the target objects and the condition objects being composed of the complex conditions; perform, according to the attribute information of the target objects and the attribute information of the condition objects, a server calculation query and obtain the geographic information query result.

In an embodiment, the complex condition query module is embodied by software stored in at least one memory and executable by at least one processor.

In an embodiment, the device further includes:
a geographic information result visualization module, configured to display the query status of the submitted complex conditions, obtain a calculation result returned by the server, and display the calculation result in a preset manner, and jump to a map page of the specific result through a click;
a self-defined complex condition query function module (i.e., complex condition query module), configured to save the defined query conditions as a query template, directly use the corresponding template to query when there is a similar query requirement, or directly enter the query process after changing some conditions in the template;
a personal favorite PIO function module (i.e., personal favorite PIO module), configured to collect PIO in query results to view the detailed information of the PIO;
a geographical location street view map function module (i.e., geographical location street view map module), configured to analyze the category of street view through the geographical location street view map, and view the street view map in two ways, namely manually input latitude and longitude information and select coordinate points from the map for query.

In an embodiment, each of the geographic information result visualization module, the self-defined complex condition query function module, the personal favorite PIO function module, and the geographical location street view map function module is embodied by software stored in at least one memory and executable by at least one processor.

In an embodiment, the device further includes: a cache replacement module, and the cache replacement module is configured to:
initialize parameters: let the expansion factor L=0 and a used cache space Mu=0, and set Mt to a capacity value of the cache server;
determine the cache object k to be cached according to the query request; determine whether the cache object k is in a self-defined template data table, set C(k)=0 when the cache object k is determined not to be in the self-defined template data table, or assign a number of existing items to C(k) when the cache object k is determined to be in the self-defined template data table;
determine whether the cache object k is in the cache space;
update the number of accesses Fr(k) of the cached object k through the following formula: Fr(k)=Fr(k)+1+C(k) and recalculate the value H(k) of the cache object k, when the cache object k is determined to be in the cache space; or
when the cache object k is determined not to be in the cache space, it indicates that the query request fails to hit the cache server, send the query request to a server, and return the cache object k after a query calculation operation is performed through a database in the server; update the number of accesses Fr(k) of the cached object k through the following formula: Fr(k)=1+C(k), calculate the value H(k) of the cache object k, and determine whether a value of a cache remaining space of the cache server is not less than the size Mk of the cache object k;
when the value of the cache remaining space of the cache server is determined not to be less than the size Mk of the cache object k, add the cache object k to the cache, and update the value of the used cache space Mu through the following formula: Mu=Mu+Mk;
when the value of the cache remaining space of the cache server is determined to be less than the size Mk of the cache object k, sort the cache objects from low to high according to H(k), and obtain n objects from the cache space by values from low to high; make the n objects satisfy H(k1)≤H(k2)≤H(k3)≤ . . . ≤H(kn) and satisfy the following conditions:

$$Mk \le Mt - Mu + \sum_{j=1}^{n} \text{Size}(k, j),$$

where j represents a cache object in the cache server, and Size(k, j) represents a size of the cache object k to be added and the cache object j to be removed;
update L to be a largest value of target value function values among the n objects; remove the n objects from the cache in turn, and add the cache object k; and update a size of the current cache space used as follows:

$$Mu = Mu + Mk - \sum_{j=1}^{n} \text{Size}(k, j).$$

In an embodiment, the cache replacement module is embodied by software stored in at least one memory and executable by at least one processor.

According to a third aspect of the disclosure, a non-transitory computer readable storage medium storing instructions therein is provided, and the instructions are executable by a processor to implement the method according to the embodiments of the disclosure.

According to the mobile terminal-oriented complex condition geographic information query method, device and medium of solutions of the disclosure, the disclosure at least has the following technical effects:

Oriented to the field of geographic information query, based on the collection, storage and classification of geographic entity location information, for the problem that users cannot meet the self-defined target object conditions when performing information query, the disclosure can make a query for the specific types and space-limited geographic entity location information.

BRIEF DESCRIPTION OF DRAWINGS

In drawings that may not necessarily be drawn to scale, the same reference numerals can describe similar components in different views. The same reference numerals with letter suffixes or different letter suffixes can represent different instances of similar components. The accompanying drawings generally illustrate various embodiments by way of example rather than limitation, and are used together with the specification and claims to illustrate the embodiments of the invention. When appropriate, use the same reference numerals in all drawings to refer to the same or similar parts. Such embodiments are illustrative and not intended as exhaustive or exclusive embodiments of the present device or method.

DETAILED DESCRIPTION OF EMBODIMENTS

In order to enable those skilled in the art to better understand the technical solutions of the disclosure, the disclosure will be described in detail below in conjunction with the accompanying drawings and specific embodiments. Embodiments of the disclosure will be described in further detail below in conjunction with the accompanying drawings and specific embodiments, but these are not intended to limit the disclosure. For the various steps described herein, if there is no need for a contextual relationship between each other, the order described herein as an example should not be considered as a limitation, and those skilled in the art will know that the order can be adjusted, as long as it does not disrupt the logic between each other, making the entire process impossible to implement.

With the continuous increase of geographic entity information related to offline scenes, the demand for related geographic information queries is constantly enriched. A geographic information system (GIS) is a computer-based tool for collecting, storing, manipulating, and visualizing geographic information, which is an application that supports query, analysis, and decision-making processes. Geographic information query is an important application field of GIS. Geographic entity location information belongs to the category of geographic information. The geographic entity location information is roughly divided into two categories: point of interest (POI) and region of interest (ROI). It should be noted that, in the disclosure, the focus is mainly on the query on POI and its attributes.

Figure 1:
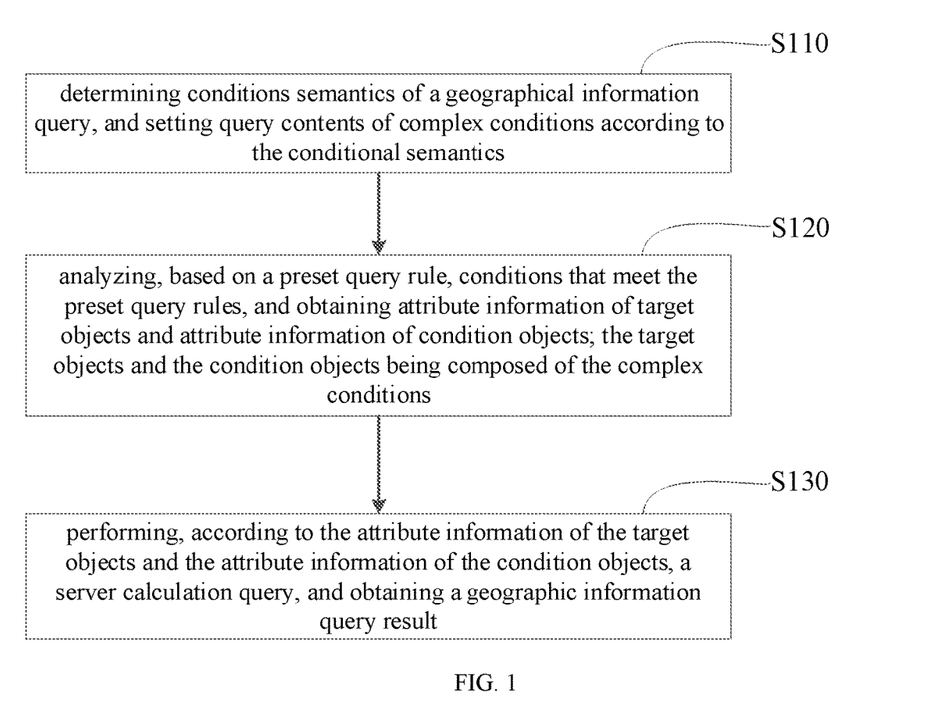
FIG. 1 illustrates a flowchart of a mobile terminal-oriented complex condition geographic information query method according to an embodiment of the disclosure.

FIG. 1 illustrates a flowchart of a mobile terminal-oriented complex condition geographic information query method according to an embodiment of the disclosure. As illustrated in FIG. 1, the embodiment of the disclosure provides a mobile terminal-oriented complex condition geographic information query method, includes the following steps.

Step 110, condition semantics of a geographic information query are determined, and query contents of complex conditions are set according to the condition semantics.

In the disclosure, the complex conditions formed by query semantics of different scenarios need to meet these characteristics. Firstly, query conditions need to contain POI categories, not only common categories, such as restaurants, fast food, etc., but also natural area categories such as cliffs and hilltops; secondly, the query conditions need to contain POI attributes, such as areas, scores, etc., there can be multiple attributes to limit the same target object; then, it is necessary to be able to add condition objects that have a positional relationship with the target objects, this positional relationship incudes within a radiation radius, a containment relationship, etc.

Step 120, based on a preset query rule, conditions that meet the preset query rule are analyzed, and attribute information of target objects and attribute information of condition objects are obtained, the target objects and the condition objects are composed of the complex conditions.

The query rule of the complex conditions can divide a query of complex conditions into two dimensions. The first dimension is the target object, which is necessary for the query. The target objects include categories, names, and attribute support. For attribute restrictions, the number of the attribute can be at least 0, and the attribute support can be set to the area, the people/vehicle flow, the score, and the number of entrances and exits; the second dimension is the condition object that has the positional relationship with the target object, which can be set at least 0, and the condition objects include categories, names, attributes, positional relationships with the target objects. For the positional relationship, it can be set to the containment relationship, within the target, within the radiation radius, and not within the radius; these two dimensions constitute the complex conditions of the system. According to this rule, the query semantics is mapped to complex conditions, and the target objects of the complex conditions and the attribute information of the complex condition objects are obtained according to the elements of the complex conditions.

Step 130, according to the attribute information of the target objects and the attribute information of the condition objects, server calculation query is carried out and a geographic information query result is obtained.

According to the obtained object attribute information, the query request is converted into a formalized query condition that the program can understand. A formal model (such as predicate logic) is used to model the query request through formal logic operators (intersection, union, complement, and, or, not, etc.). The query of the target objects is to filter the result set by the categories, names, and attributes of the target objects, and the query of the condition objects is to first filter the result set of the categories, names, and attributes of the condition objects, and then according to the self-defined positional relationship, to calculate the spatial relationship between the target object set and the condition object set. In order to support complex multi-dimensional geographic queries, it is necessary to combine data from multiple sources. Google platform data provides people flow information, open street map (OSM) open source database provides natural information such as bridges, lighthouses, street lamps, obstacles, forests, water flows, and spatial data such as areas and roads, Gaode map provides a wealth of entrance and exit information, and these multi-source data are fused together to support the multi-dimensional geographic information query.

The huge amount of data brings query efficiency and performance problems to the server to calculate query results. In order to reduce the reading and load pressure caused by complex condition queries on server calculations, and to improve the speed of returning results from network requests, a cache server is added to the system, which can improve data acquisition efficiency and reduce query waiting time. When a network request for a query with complex conditions is issued, it is determined whether a network request object is in a cache space. If it hits the cache space, the query result is returned directly from the cache server; if the request fails to hit the cache server, the query calculation operation is performed on the database and then the result is returned.

Figure 2:
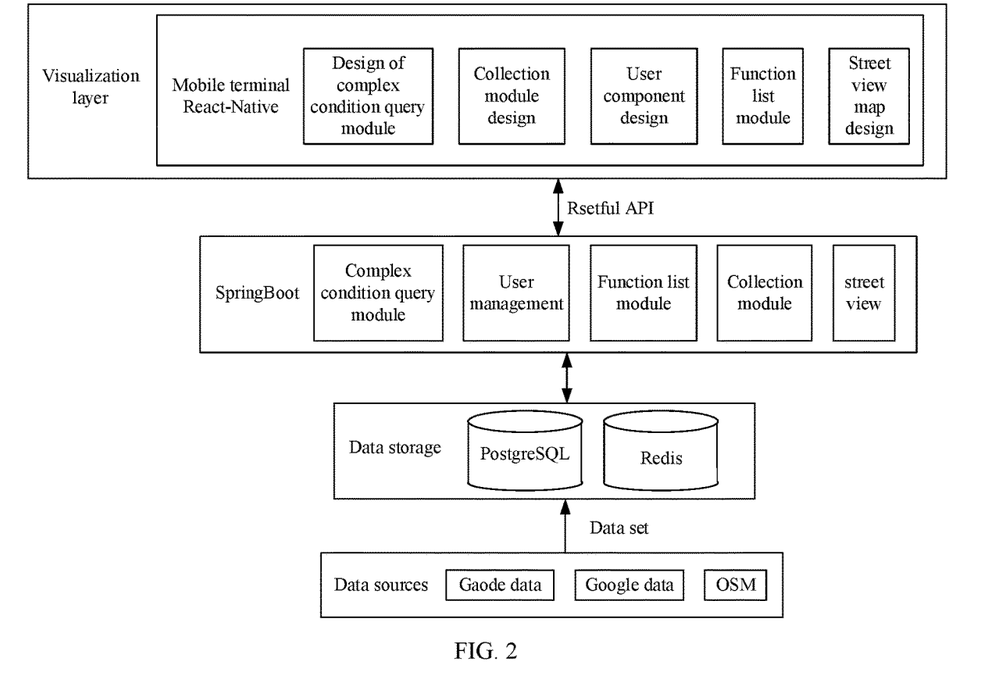
FIG. 2 illustrates a schematic frame diagram of a mobile terminal-oriented complex condition geographic information query device according to an embodiment of the disclosure.

FIG. 2 illustrates a schematic frame diagram of a mobile terminal-oriented complex condition geographic information query device according to an embodiment of the disclosure. As illustrated in FIG. 2, on the basis of the above-mentioned embodiment, the mobile terminal-oriented complex condition geographic information query device includes: a data source module, a data storage layer, a background management system and a visualization layer.

The data source module is a data support part of the geographic information query system. The data support part is the existing data, such as the original data that can be obtained from the Gaode platform, Google platform and OSM platform under the premise of obtaining authorization. A series of operations such as cleaning, data alignment, and data fusion are performed to transform the original data into usable data to support the normal operation of the system.

The data storage layer mainly uses PostgreSQL to store application data. Since the geographic information data involves spatial storage and calculation, a database with spatial index and spatial computing capabilities is used, and PostgreSQL's extended database: PostGIS is installed to store geographic information POI data, and data about user information, etc. Due to the complexity of the query conditions of this system, it takes a certain amount of time to calculate the query results based on the SQL statements generated according to the complex conditions, so the Redis cache database is used to store some commonly used results with high frequency, so as to improve the speed of query results.

The background management system is mainly built using the Spring Boot framework. The main functions of this layer are extended from complex condition query operations. With the help of specific jar packages that meet geographic information operation requirements, the visualization layer is provided with services through the Restful API, and the Restful API is communicated with the visualization layer through GET, POST and other operations interact, and the interactive data is usually a JSON object; the stable operation of the system through log service and exception handling is maintained, and a Spring Boot's AOP module is used to calculate the running time of the steps in the process of business logic processing, so as to help optimize the system performance.

The visualization layer is built using React Native to interact with users. This device splits front and back ends through the Restful API method. With the help of the Restful API name, it is easy to identify and implement functions through the interface document, which improves the development efficiency. The componentized development mode and the MobX state management library are adopted to better realize the business logic and update the data information displayed by the system in a timely manner. Business logic relies on the combination and nesting of common components and business components to build, so as to realize business requirements.

Figure 3:
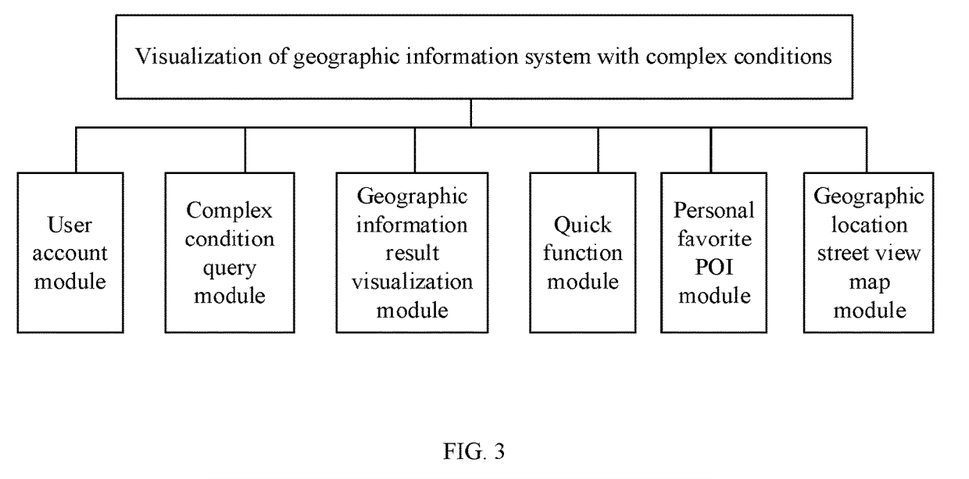
FIG. 3 illustrates a schematic diagram of functional modules of a mobile terminal-oriented complex condition geographic information query device according to an embodiment of the disclosure.

FIG. 3 illustrates a schematic diagram of functional modules of a mobile terminal-oriented complex condition geographic information query device according to an embodiment of the disclosure. As shown in FIG. 3, the mobile terminal-oriented complex condition geographic information query device includes: a user account module, a complex condition query module, a geographic information result visualization module, a quick function module, a personal favorite POI module, and a geographic location street view map module.

The user account module is used to set basic personal information of users and modify passwords. The setting of basic personal information is to realize functions that the users can modify nicknames, personal profiles and contact numbers. When the user enters the basic setting page, the nickname, the personal profile, and the contact number that the user has set and saved in the database can be obtained by using the interface method. Because the mailbox is the credential for the user to use the system, it cannot be changed; when the user fills in the information, the information is submitted through a basic information update button on the page, and the filled information is sent to the back end in the form of an interface for processing. Whether the modification succeeds or fails, the corresponding result information will be displayed. The function of modifying the password is that when the user enters the modifying password page, he can change the password form he wants according to the existing password. When the password is changed successfully, the account information cached in the system will be cleared, and the login page will be redirected, where the user re-enters the account information to log in.

In the complex condition query module, when the user enters the query page, the query conditions are generated by selecting the query category, filling in the target name, selecting the target attribute, whether to add target attributes, and whether to add complex conditions; when complex conditions are added, the complex conditions are optimized by selecting the complex condition query category, condition name, and condition attribute, and selecting the complex condition and the positional relationship of the target object. When the condition definition is completed, a network request is sent through the submit button, and automatically jumping to the query result page.

In the geographic information result visualization module, when the user determines the query conditions and submits the network request, the system is in the query state before the query result is obtained, and the query state is divided into three types: querying, query error, and query completed. When the user clicks a POI result in the list, it will jump to the map page. The map is displayed as the background of the POI information points. The map is displayed as a standard map by default. The map can be zoomed. By obtaining the positions of the latitude and longitude information of the result information points on the map, other components displayed on the map are all on the map in terms of display effect. The map points that enter the map display page through a specific result are displayed as red icons, while other result information points will also be displayed on the map, but they are marked in blue. The map marker points can be clicked, if the blue map point is clicked, it will jump directly to the detailed information page, where further details about the result POI points are known, such as whether the query result satisfies the self-defined conditions. On the map page there is a floating action button positioned in the lower right corner of the phone screen. When the floating action button is clicked, it will expand four operation options, namely, changing map mode, road conditions, location, and adding template function.

The quick function module includes self-defined complex condition functions and common query functions of geographic system. Since the definition of complex conditions is a bit complicated, it supports users to add commonly used complex conditions as condition templates. This self-defined complex condition function is mainly used to display the user has been added to the database of the complex conditions, to support the user directly from the function module for complex conditions of the query, but also can be edited, delete complex conditions. Some queries that users may frequently use are placed in the common functions, including Hong Kong's main road traffic flow, Hong Kong people flow heat map, Hong Kong traffic information query (link), internal map of large facilities, and camera distribution.

In the personal favorite POI module, when the user adds the favorite point in the result visualization module, it can be found in the personal favorite function. On the favorite page, the user's favorite points can be obtained through the interface method. The information of the favorite points includes latitude and longitude, and description information. When the information is obtained successfully, the map is used as the background of the page to display the map and the favorite points; the function components are displayed at the lower right of the page to switch the map mode and traffic information; the list components are displayed at the upper right of the page to display the favorite point list, the list is not displayed by default.

In the geographic location street view map module, the map is used as the background of the page. After the map tool is activated, it means that the map is in an interactive state, the user can directly click on the location on the map page to obtain the location of the street map information; the user can also directly enter the latitude and longitude to obtain the information of the point and call the interface method to send a network request, when the request is complete, it is displayed with a title, image, and analyzed text.

Figure 4:
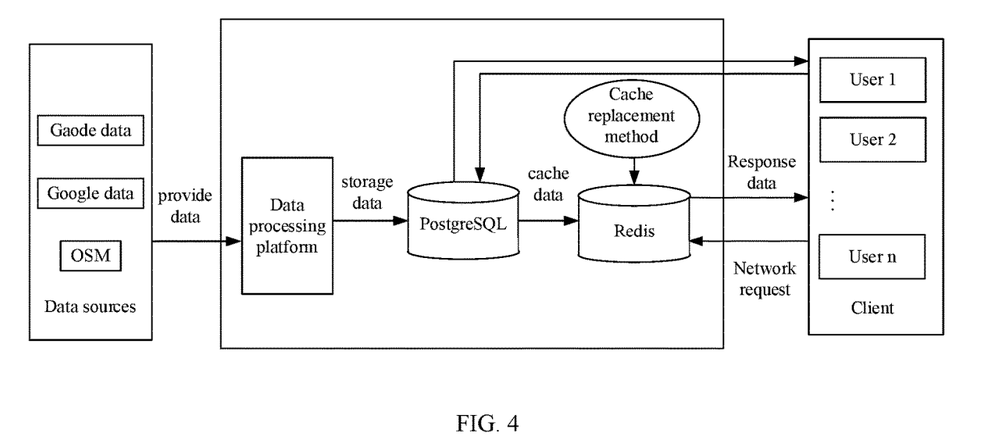
FIG. 4 illustrates an overall frame diagram of a cache according to an embodiment of the disclosure.

FIG. 4 illustrates an overall frame diagram of a cache in the mobile terminal-oriented complex condition geographic information query device according to an embodiment of the disclosure. As illustrated in FIG. 4, as support for the system in order to support the more complex multi-dimensional geographic query, it needs to combine multiple sources of data to realize, Google platform data provides people flow information, OSM open source database provides bridges, lighthouses, street lamps, barriers, forests, water flow and other natural information and spatial data such as the area and roads, GaoDe map provides a wealth of information about the entrances and exits, the fusion of these multiple sources of data together to support the multi-dimensional geographic information query. For the huge amount of data, a large number of data tables can be created to store them, and it takes a lot of time to perform calculations when making database queries, which will reduce the query performance of the server and easily lead to an overburdened database. So in order to avoid frequent data queries, the database cache is provided to store some of the results of the query in the memory, and can return the results directly from the memory when the same object is queried, thus improving the query speed and response efficiency.

Specifically, target values of cache objects in the cache server are determined according to access frequencies, collection frequencies and object sizes of the cache objects; and the cache objects include target objects and condition objects in the complex conditions.

The target values of the cache objects in the cache server are calculated by the following formula:

$$H(k) = L + (Fr(k) + C(k)) * \frac{Value_{(k)}}{\log_2(Size(k))}.$$

In the above formula, H(k) represents a value of a cache object k, Value(k) represents a cost of access delay and network bandwidth for adding the cache object k to the cache server, Size(k) represents a size of the cache object k, L is an expansion factor, its initial value is 0, when the cache capacity is insufficient, object replacement occurs, the value H(j) of the replaced object j with the largest value among a plurality of replaced objects with small values is assigned to L, Fr(k) represents a number of accesses of the cached object k and its initial value is set to 1, and C(k) represents the number of times the cache object k is stored in the database.

The cache objects in the cache server are updated according to the target values of the cache objects in the cache server.

Figure 5:
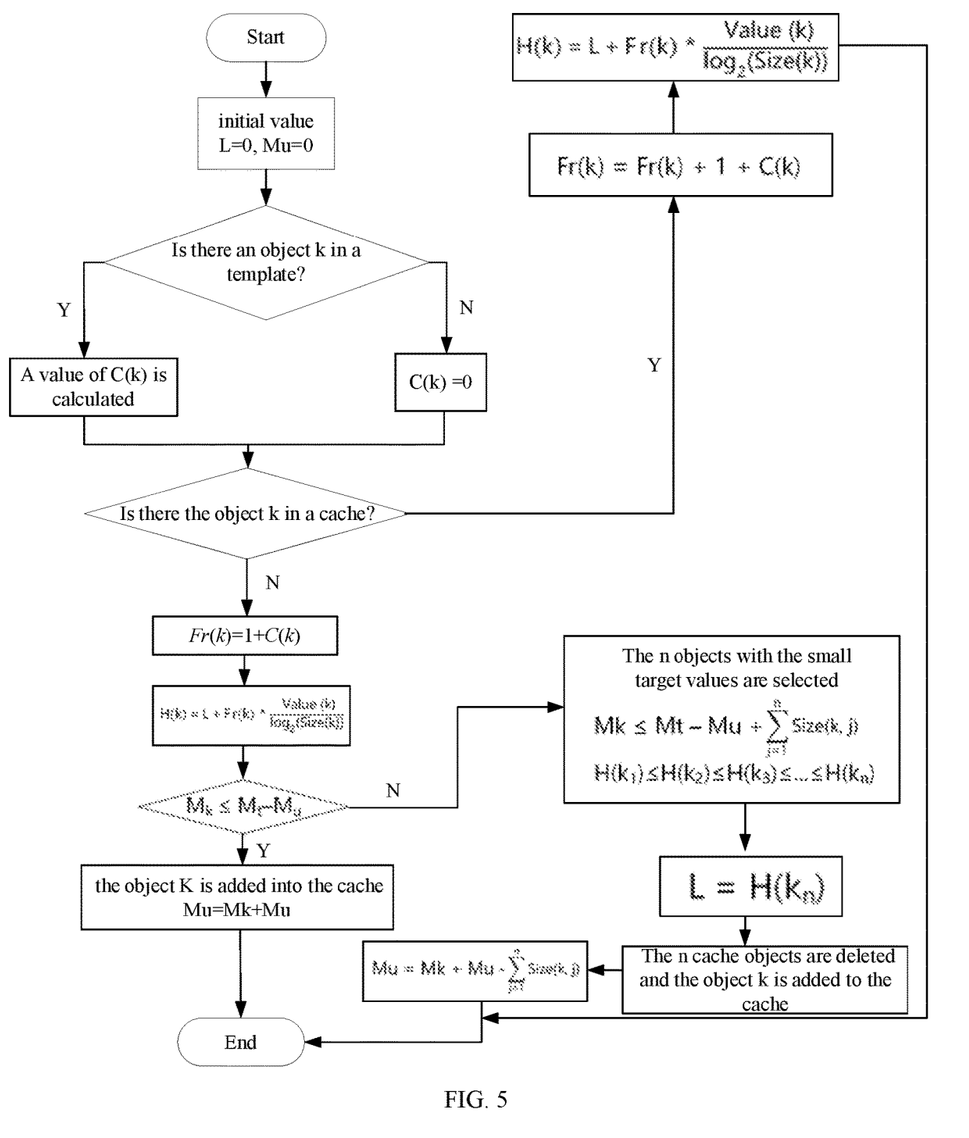
FIG. 5 illustrates a flowchart of a data caching method in a mobile terminal-oriented complex condition geographic information query method according to an embodiment of the present invention.

FIG. 5 illustrates a flowchart of a data caching method of the disclosure, as illustrated in FIG. 5, the data caching method includes the following steps.

Step 1, parameters are initialized: L=0, Mu=0, and Mt is set to a capacity value of a Redis cache server.

Step 2, when a user network request arrives, a network request object is defined as k; it is determined whether the object k is in the self-defined template data table, if not, setting C(k)=0, otherwise, assigning the number of existing items to C(k).

Step 3: it is determined whether the object k is in the cache space, if the object k hits the Redis cache, going to step 4, otherwise going to step 5.

Step 4: the number of accesses Fr(k) of the cached object k is updated as follows: Fr(k)=Fr(k)+1+C(k), and the latest Fr(k) is brought into the target value calculation formula, and the value H(k) of the cached object k is re-calculated, this caching process is over.

Step 5: entering this step indicates that the request fails to hit the cache server, and the network request is sent to the database system of the geographic information query system, and the query object k is returned after the query calculation operation is performed through the database; the access frequency is updated Fr(k)=1+C(k), the latest Fr(k) is brought to the target value calculation formula to calculate H(k); the next step is to determine whether the value of the remaining space (Mt−Mu) in the server cache is not less than the size Mk of the current access object k, if the data of the access object k can continue to be stored, go to step 6, otherwise go to step 7.

Step 6: the access object k is added to the cache, and the value of the used cache space Mu is updated as follows: Mu=Mu+Mk, this caching process is over.

Step 7: the cached objects are sorted from low to high according to H(k), and n objects are found from the cache space according to the values from low to high, so that these n objects satisfy H(k1)≤H(k2)≤H(k3)≤ . . . ≤H(kn) and satisfy the following method:

$$Mk \le Mt - Mu + \sum\nolimits_{j=1}^{n} Size(k, j).$$

Step 8: L is updated to a largest value of target value function values among then objects, that is, L=H(Kn); the n objects are removed from the cache in turn, and the object k is added into the cache; the size used of the current cache space is updated, this caching process is over.

Furthermore, while exemplary embodiments have been described herein, the scope includes any and all implementations based on the disclosure having equivalent elements, modifications, omissions, combinations (e.g., crossover aspects of various embodiments), adaptations, or changes embodiments. Elements in the claims are to be interpreted broadly based on the language employed in the claims and are not limited to examples described in this specification or during the practice of the disclosure, which examples are to be construed as non-exclusive. It is therefore intended that the specification and examples be considered as illustrations only, with a true scope and spirit being indicated by the following claims, along with their full scope of equivalents.

The above description is intended to be illustrative rather than restrictive. For example, the above examples (or one or more solutions thereof) may be used in combination with each other. For example, other embodiments may be used by those skilled in the art upon reading the above description. Additionally, in the foregoing detailed description, various features may be grouped together in order to simplify the disclosure. This should not be interpreted as intending that an unclaimed inventive feature is essential to any claim. Rather, the subject matter of the disclosure may lie in less than all features of a particular embodiment of the disclosure. Thus, the following claims are hereby incorporated into the detailed description as examples or embodiments, where each claim stands on its own as a separate embodiment, and it is contemplated that these embodiments may be combined with each other in various combinations or permutations. The scope of the disclosure should be determined with reference to the appended claims, along with the full scope of equivalents to which such claims are entitled.

What is claimed is:

1. A mobile terminal-oriented complex condition geographic information query method, comprising:
   determining conditions semantics of a geographical information query, and setting query contents of complex conditions according to the conditions semantics;
   analyzing, based on a preset query rule, conditions that meet the preset query rule, and obtaining attribute information of target objects and attribute information of condition objects; wherein the target objects and the condition objects are composed of the complex conditions;
   performing, according to the attribute information of the target objects and the attribute information of the condition objects, a server calculation query, and obtaining a geographic information query result;
   determining target values of cache objects in a cache server according to access frequencies, collection frequencies and object sizes of the cache objects; wherein the cache objects comprise the target objects and the condition objects in the complex conditions, and the target values of the cache objects in the cache server are calculated by the following formula:

$$H(k) = L + (Fr(k) + C(k)) * \frac{\text{Value}_{(k)}}{\log_2(\text{Size}(k))},$$

where H(k) represents a value of a cache object k; Value(k) represents a cost of access delay and network bandwidth for adding the cache object k to the cache server; Size(k) represents a size of the cache object k; L represents an expansion factor, an initial value of L is 0, an object replacement is performed when a cache capacity is insufficient, and a value H(j) of a replaced object j with the largest value among a plurality of replaced objects with small values is assigned to L; Fr(k) represents a number of accesses of the cached object k, an initial value of Fr(k) is set to 1; and C(k) represents a number of times that the cache object k is stored in a database; and
   updating the cache objects in the cache server according to the target values of the cache objects in the cache server;
   wherein the updating the cache objects in the cache server according to the target values of the cache objects in the cache server, comprises:

initializing parameters: letting the expansion factor L=0 and a used cache space Mu=0, and setting Mt to a capacity value of the cache server;
   determining the cache object k to be cached according to a query request; determining whether the cache object k is in a self-defined template data table, setting C(k)=0 when the cache object k is determined not to be in the self-defined template data table, or assigning a number of existing items to C(k) when the cache object k is determined to be in the self-defined template data table;
   determining whether the cache object k is in a cache space:
   updating the number of accesses Fr(k) of the cached object k through the following formula: Fr(k)=Fr(k)+1+C(k) and recalculating the value H(k) of the cache object k, when the cache object k is determined to be in the cache space; or
   when the cache object k is determined not to be in the cache space, it indicates that the query request fails to hit the cache server, sending the query request to a server, and returning the cache object k after a query calculation operation is performed through a database in the server; updating the number Fr(k) of accesses of the cached object k through the following formula: Fr(k)=1+C(k), calculating the value H(k) of the cache object k, and determining whether a value of a cache remaining space of the cache server is not less than the size Mk of the cache object k:
   adding the cache object k to the cache server, and updating the value of the used cache space Mu through the following formula: Mu=Mu+Mk, when the value of the cache remaining space of the cache server is determined not to be less than the size Mk of the cache object k; or
   when the value of the cache remaining space of the cache server is determined to be less than the size Mk of the cache object k, sorting the cache objects from low to high according to H(k), and obtaining n objects from the cache space by values from low to high; making the n objects satisfy H(k1)≤H(k2)≤H(k3)≤ . . . ≤H(kn) and satisfy the following conditions:

$$Mk \leq Mt - Mu + \sum\nolimits_{j=1}^{n} \text{Size}(k, j).$$

where j represents a cache object in the cache server, and Size(k, j) represents a size of the cache object k to be added and the cache object j to be removed;
   updating L to be a largest value of target value function values among the n objects; removing the n objects from the cache server in turn, and adding the cache object k; and updating a size of a current cache space used as follows:

$$Mu = Mu + Mk - \sum\nolimits_{j=1}^{n} \text{Size}(k, j).$$

2. The method as claimed in claim 1, wherein the determining conditions semantics of a geographical information query, and setting query contents of complex conditions according to the conditions semantics, comprises:

determining query requirements in different usage scenarios, defining query semantics, and mapping the query semantics into the complex conditions through constituent elements;

wherein the complex conditions formed by the query semantics for the different usage scenarios comprise point of interest (POI) categories, POI attributes, the target objects, and the condition objects that have a positional relationship with the target objects; the POI categories comprise building categories and natural area categories; the PIO attributes comprise areas and scores of the POI categories, and the positional relationship comprises a radiation radius and a containment relationship.

3. The method as claimed in claim 1, wherein the analyzing, based on a preset query rule, conditions that meet the preset query rule, and obtaining attribute information of target objects and attribute information of condition objects, comprises:

dividing a query of the complex conditions into two dimensions to form the preset query rule, wherein the two dimensions comprise the target objects and the condition objects, the target objects comprise categories, names and attribute support, and the attribute support comprises areas, people/vehicle flows, scores, and a number of entrances and exits; the condition objects comprise categories, names, and attributes; the condition objects have a positional relationship with the target objects, and the positional relationship comprises one of inclusion relationship, within a target, within a radiation radius and not included within a radius; and analyzing the complex conditions according to the preset query rule, and obtaining the attribute information of the target objects and the attribute information of the condition objects.

4. The method as claimed in claim 1, wherein the performing, according to the attribute information of the target objects and the attribute information of the condition objects, a server calculation query, and obtaining a geographic information query result, comprises:

using, according to the query request composed of the attribute information of the target objects and the attribute information of the condition objects, a formalized model to model the query request through a formalized logic algorithm, and converting the query request into a formalized query condition;

based on the formalized query condition and data from multiple sources: for a query of the target objects, filtering the categories, the names, and the attributes of the target objects, and returning the geographic information query result; for a query of the condition objects, filtering the categories, the names, and the attributes of the condition objects, and performing, according to a positional relationship, a spatial relationship calculation on a target object set and a condition object set, and returning the geographic information query result.

5. A non-transitory computer readable storage medium storing instructions therein, wherein the instructions are executable by a processor to implement the method as claimed in claim 1.

* * * * *